(12) United States Patent
Hatanaka et al.

(10) Patent No.: US 6,504,704 B1
(45) Date of Patent: Jan. 7, 2003

(54) SOLID ELECTROLYTIC CAPACITOR AND PRODUCTION METHOD THEREOF

(75) Inventors: Kazuhiro Hatanaka, Toda-gun (JP); Kazunori Naraya, Fussa (JP); Kazuhiro Higuchi, Nagai (JP)

(73) Assignee: Nippon Chem-Con Corporation, Tokyo (JP)

( * ) Notice: Subject to any disclaimer, the term of this patent is extended or adjusted under 35 U.S.C. 154(b) by 0 days.

(21) Appl. No.: 09/937,540

(22) PCT Filed: Sep. 29, 1999

(86) PCT No.: PCT/JP99/05324

§ 371 (c)(1),
(2), (4) Date: Dec. 26, 2001

(87) PCT Pub. No.: WO00/58979

PCT Pub. Date: Oct. 5, 2000

(30) Foreign Application Priority Data

Mar. 29, 1999 (JP) ............................................ 11-086074
Sep. 17, 1999 (JP) ............................................ 11-263331

(51) Int. Cl.⁷ .................................................. H01G 9/04
(52) U.S. Cl. ...................... 361/511; 361/512; 361/523; 361/528; 361/502; 29/25.03; 252/62.2
(58) Field of Search .................................. 361/511, 512, 361/508, 509, 523, 525, 528, 529, 532, 504, 433, 502, 505, 516; 29/25.03; 252/62.2

(56) References Cited

U.S. PATENT DOCUMENTS 4,679,124 A * 7/1987 Yoshimura et al. ......... 361/433
4,858,078 A * 8/1989 Morimoto et al. .......... 361/527
4,970,626 A * 11/1990 Kakinoki et al. ............ 361/512
5,733,661 A * 3/1998 Ue et al. ..................... 428/426
5,748,438 A * 5/1998 Davis et al.
5,754,394 A * 5/1998 Evans et al.
5,827,602 A * 10/1998 Koch et al
6,166,899 A * 12/2000 Tamamitsu .................. 361/504
6,274,061 B1 * 8/2001 Tamamitsu

FOREIGN PATENT DOCUMENTS

| JP | 03-150825 | 6/1991 |
| JP | 04-329620 | 11/1992 |
| JP | 09-186054 | 7/1997 |
| JP | 09-270371 | 10/1997 |

* cited by examiner

*Primary Examiner*—Dean A. Reichard
*Assistant Examiner*—Nguyen T Ha

(57) ABSTRACT

As a cathode foil, an etched aluminum foil is used, where a TiN film is prepared on the surface thereof by cathode arc plasma deposition process. As an anode foil, an etched aluminum foil is used, where a dielectric film is prepared on the surface thereof by a formation process. Winding together the anode foil along with the cathode foil and a separator, a capacitor element is prepared. While placing an organic semiconductor including a desired TCNQ complex sale in a bottomed cylindrical aluminum case and melting the TCNQ complex sale under heating on a heater heated to about 300° C., then, the capacitor element heated to about 250° C. is placed in the aluminum case, to impregnate the capacitor element with the melted TCNQ complex sale and immediately immerse the aluminum case in cooling water to cool and solidify the TCNQ complex salt. Then, the capacitor element is sealed with a resin to prepare a solid electrolytic capacitor.

18 Claims, No Drawings

SOLID ELECTROLYTIC CAPACITOR AND PRODUCTION METHOD THEREOF

TECHNICAL FIELD

The present invention relates to a solid electrolytic capacitor and a method for producing the same. More specifically, the invention relates to a solid electrolytic capacitor with modifications intended for the improvement of the capacitance value and the impedance properties, for the purpose of achieving capacitor downsizing.

BACKGROUND OF THE INVENTION

Following the recent digitalization and high-frequency modification of electronic appliances, a small-type capacitor with a big capacitance and a low impedance in a high-frequency region has been needed in the field of electric source, in particular.

For such need, a solid electrolytic capacitor has been used, which is produced by assembling a capacitor element by winding together a cathode foil comprising a valve metal such as aluminium and an anode foil comprising a valve metal and having an oxide film prepared on the surface thereof through a separator to prepare a solid electrolyte between these cathode and anode foils. Because such winding-type solid electrolytic capacitor has a characteristic profile of a small type and a large capacitance and also has great impedance properties in a high-frequency region, the capacitor is one of the most suitable capacitors for the need. In such type of solid electrolytic capacitor, additionally, tantalum, niob and titanium other than aluminium are used as the anode material, while metals of the same species as those for the anode material are used as the cathode material.

So as to increase the capacitance of electrolytic capacitor, importantly, the capacitance of the cathode material as well as the capacitance of the anode material should be improved. The capacitance of each electrode of electrolytic capacitor is defined by the type and thickness of an insulation film prepared on the electrode surface and the surface area of the electrode. Given that the dielectric constant of insulation film is $\epsilon$; the thickness of insulation film is t; and the surface area of electrode is A, the capacitance C is expressed by the following equation.

$$C=\epsilon(A/t)$$

So as to raise the capacitance, as apparently shown by the equation, it is effective to enlarge the electrode surface area, select an insulation film material with a higher dielectric constant and prepare a thinner insulation film.

Attempts have been made conventionally to enlarge the electrode surface area so as to increase the capacitance, because the dielectric constant of insulation film is defined by the electrode material, while the thickness of insulation film is defined by voltage resistance among them. However, just simple use of a large-type electrode to get an enlarged surface area is not preferable, because it leads to the scale up of electrolytic capacitor. Thus, the surface of aluminium foil as the substrate of electrode material has been etching processed traditionally to prepare recesses and protrusions thereon to enlarge the substantial surface area.

Additionally, Japanese Patent Laid-open No. Sho-59-167009 (167009/1984) discloses a cathode material with a metal film prepared on the surface of the substrate by utilizing metal deposition technique, as an alternative of the etching process. According to the technique, film preparation conditions should be selected, to prepare fine recesses and protrusions on the film surface to thereby enlarge the surface area, so that a large capacitance can be recovered. Additionally, metals exerting high dielectric constants in the form of oxides thereof, such as Ti, can elevate the dielectric constant of the insulation film prepared on the surface of the cathode material, leading to a larger capacitance.

Furthermore, Japanese Patent Laid-open No. Hei-3-150825 (150825/1991) previously filed by the present applicant discloses a technique for preparing a deposition layer comprising titanium nitride on the surface of high-purity aluminium used as a cathode electrode by cathode arc deposition process, so as to elevate the capacitance value of the cathode side, in light of the finding that the capacitance of electrolytic capacitor is the composite capacitance of the capacitances of the anode side and the cathode side in serial connection.

[Problems to be Solved]

However, solid electrolytic capacitors using the cathode foils prepared by the conventional techniques described above have the following drawbacks. In other words, the surface of aluminium foil as the substrate of the electrode material in conventional solid electrolytic capacitors is etching processed, so as to elevate the capacitance of the electrolytic capacitors. When etching is processed too excessively, the solubilization of the surface of the aluminium foil concurrently progresses, which adversely blocks the elevation of the surface enlargement ratio. The elevation of the capacitance of electrode material by etching technique was limited.

Additionally, the technique for preparing a deposition layer comprising titanium nitride on the surface of cathode foil has also been problematic. More specifically, manganese dioxide prepared by thermal decomposition of manganese nitrate has mainly been used as the solid electrolyte of conventional solid electrolytic capacitors. During the process of preparing manganese dioxide, however, thermal treatment at 200 to 300° C. should be carried out several times. Therefore, oxide film was formed on the surface of the film comprising metal nitride as prepared on the surface of the cathode foil, which caused the reduction of the capacitance of the cathode foil, leading to the reduction of the capacitance of the electrolytic capacitor. Furthermore, ESR reduction was also limited, because manganese dioxide is at a relatively high electric conductivity.

OBJECTS OF THE INVENTION

The present invention has been proposed so as to overcome the problems of the conventional techniques. It is a first object of the invention to provide a solid electrolytic capacitor with an improved capacitance value, and a method for producing the same. It is a second object of the invention to provide a solid electrolytic capacitor not only with an improved capacitance value but also with a low impedance at high frequency, and a method for producing the same.

DISCLOSURE OF THE INVENTION

So as to overcome the problems, the present inventors have made investigations about a solid electrolytic capacitor with an improved capacitance value and an improved impedance property, and a method for producing the same. Consequently, the invention has been achieved.

Specifically, it has been found that the capacitance value of a winding-type solid electrolytic capacitor using an organic semiconductor comprising a TCNQ complex salt can be improved, greatly, by preparing a film comprising a metal nitride on the surface of the cathode foil by deposition process.

It has additionally been found that the capacitance value and impedance property of a winding-type solid electrolytic capacitor using an organic semiconductor comprising a TCNQ complex salt can be improved, greatly, by preparing an oxide film on the surface of the cathode foil and additionally preparing a film comprising a metal nitride thereon by deposition process.

First, the inventors have made various investigations about a winding-type solid electrolytic capacitor using an organic semiconductor having been drawing attention recently. Further, N-n-butylisoquinolinium TCNQ complex salt, N-methyl-3-n-propylimidazol TCNQ complex salt, and N-n-alkylisoquinolinium TCNQ complex salt can be used as the organic semiconductor. Herein, TCNQ means 7,7,8,8-tetracyanoquinodimethane. Additionally, these TCNQ complex salts can be prepared by known methods.

Furthermore, the inventors prepared TiN on the surface of cathode foil by deposition process. Using the resulting cathode foil, the inventors prepared a capacitor under the following conditions, to measure the capacitance of the cathode foil alone. It was shown that the capacitance thereof was infinite. This means that TiN prepared on the cathode foil removed a part of the spontaneous oxide film formed on the surface of the cathode foil, so that TiN and the metal of the cathode foil were in continuity.

Additionally, the inventors prepared an oxide film on the surface of the cathode foil at various formation voltages and additionally prepared TiN thereon by deposition process. Using the cathode foil, then, the inventors prepared a capacitor to measure the capacitance of the cathode foil alone. It was shown that the capacitance was infinite. This means that TiN prepared on the oxide film removed a part of the oxide film prepared on the surface of the cathode foil, so that TiN and the metal of the cathode foil were in continuity.

Meanwhile, the capacitance C of electrolytic capacitor is the composite capacitance of the capacitance Ca and the capacitance Cc of the anode side and the cathode side, respectively, in serial connection, which is expressed by the following equations.

$$1/C=1/Ca+1/Cc$$

$$\therefore C=(Ca \times Cc)/(Ca+Cc)=Ca \times 1/(Ca/Cc+1)$$

As apparently shown by the aforementioned equations, the capacitance C of the capacitor is smaller than the capacitance Ca of the anode side, as long as Cc has a value (the cathode foil has a capacitance). In other words, the capacitance component of the cathode foil is eliminated in case that the capacitance Cc of the cathode foil is infinite, owing to the continuity between the TiN deposited on the surface of the cathode foil and the metal of the cathode foil. Thus, the capacitance C as the composite capacitance of the capacitances of the anode foil and the cathode foil in serial connection, is equal to the capacitance Ca of the anode side. Then, the capacitance C is at maximum.

(Method for Preparing Film Comprising Metal Nitride on Cathode Foil)

As the metal nitride, further, use can be made of TiN, ZrN, TaN, NbN and the like, on the surface of which oxide film is hardly formed. The film to be prepared on the surface of the cathode comprises not only the metal nitride but also other conductive materials with a film-forming potency and with less oxidizability. For example, Ti, Zr, Ta, Nb and the like may be used as such.

Additionally, the method for preparing a film comprising a metal nitride on the cathode comprising a valve metal preferably comprises deposition process, from the respects of the strength of the prepared film, the adhesion thereof to the cathode, and the control of filming conditions. Particularly, cathode arc plasma deposition process is more preferable.

The applicable conditions of the cathode arc plasma deposition process are as follows. Specifically, the electric current is at a value of 80 to 300 A and the voltage is at a value of 15 to 20 V. In case of the metal nitride, further, the cathode arc plasma deposition process is carried out by heating the cathode comprising a valve metal to 200 to 450° C. in an atmosphere at the overall pressure inclusive of nitrogen being $1 \times 10^{-1}$ to $1 \times 10^{-4}$ Torr.

(Method for Preparing Oxide Film on Cathode Foil)

As the method for preparing oxide film on cathode foil, use may be made of general preparation processes for preparing oxide film on anode. Specifically, an oxide film is prepared on the surface of cathode foil by the application of voltage in a formation solution.

As the formation solution of the cathode foil, additionally, use may be made of formation solutions of phosphates, such as ammonium dihydrogen phosphate and diammonium hydrogen phosphate; formation solutions of borates, such as ammonium borate; and formation solutions of adipates, such as ammonium adipate. Among them, ammonium dihydrogen phosphate is preferable. Additionally, the concentration of ammonium dihydrogen phosphate is 0.005 to 3%, preferably.

The formation voltage applied for the formation of the oxide film is preferably 10 V or less. The reason is as follows. When the formation voltage is 10 V or more, the thickness of the oxide film increases, leading to the increase of the thickness of the dielectric film of the cathode foil, so that the capacitance of the cathode foil is reduced, to thereby reduce the composite capacitance of the capacitances of the anode foil and the cathode foil. Further, the formation voltage is preferably 1 V or more, because the effect is reduced below 1 V.

(Method No. 1 for Producing Solid Electrolytic Capacitor)

Continuously, a first method for producing a solid electrolytic capacitor of a winding type is described, where an organic semiconductor comprising a TCNQ complex salt as the electrolyte layer is used. Herein, the first method can achieve the first purpose of the invention.

As the cathode foil, specifically, use is made of a cathode foil, where a TiN film is prepared on the etched aluminium foil by cathode arc plasma deposition process. Further, the conditions of the cathode arc plasma deposition process are as follows. Using a Ti target in nitrogen atmosphere and heating the cathode comprising a valve metal to 200 to 450° C., cathode arc plasma deposition is executed at the overall pressure inclusive of nitrogen being $1 \times 10^{-1}$ to $1 \times 10^{-4}$ Torr and at 80 to 300 A and 15 to 20 V. As the anode foil, further, use can be made of an anode foil with a dielectric film prepared on the surface of the etched aluminium foil by a formation process according to a conventional method. Winding the anode foil together with the cathode foil and a separator, a capacitor element is prepared.

While placing an organic semiconductor comprising a desired TCNQ complex salt in a bottomed cylindrical aluminium case and melting the TCNQ complex salt under heating on a heater heated to about 300° C., then, the capacitor element heated to about 250° C. is placed in the aluminium case, to impregnate the capacitor element with the melted TCNQ complex salt and immediately immerse the aluminium case in cooling water to cool and solidify the TCNQ complex salt, thereby recovering a desired solid electrolyte layer. Subsequently, the capacitor element is sealed with a resin to prepare a solid electrolytic capacitor.

The time required for the organic semiconductor from the completion of liquefaction to solidification under cooling is set preferably within one minute, more preferably within 15 seconds. As the heating and melting means of such organic semiconductor comprising the TCNQ complex salt as placed in the case, use may be made of the hot plate mode for heating the case on heater block, soldering bath, infrared melting mode, inductive heating mode and the like.

(Method No.2 for Producing Solid Electrolytic Capacitor)

Continuously, a second method for producing a solid electrolytic capacitor of a winding type is described, where an organic semiconductor comprising a TCNQ complex salt is used as the electrolyte layer. Herein, the second method can achieve the second purpose of the invention.

As the cathode foil, specifically, use is made of an etched aluminium foil, which has been formation processed in a 0.005 to 3% aqueous solution of ammonium dihydrogen phosphate at 10 V, and on the surface of which a TiN film has been prepared by cathode arc plasma deposition process. As described above, further, the conditions of the cathode arc plasma deposition process are as follows. Using a Ti target in nitrogen atmosphere and heating the cathode comprising a valve metal to 200 to 450° C., cathode arc plasma deposition is executed at the overall pressure inclusive of nitrogen being $1\times10^{-1}$ to $1\times10^{-4}$ Torr and at 80 to 300 A and 15 to 20 V. As the anode foil, further, use can be made of an etched aluminium foil, after the surface thereof is treated with a formation process according to conventional methods, to prepare a dielectric film thereon. Winding together the anode foil and the cathode foil through a separator, a capacitor element is prepared.

While placing an organic semiconductor comprising a desired TCNQ complex salt in a bottomed cylindrical aluminium case and melting the TCNQ complex salt under heating on a heater heated to about 300° C., then, the capacitor element heated to about 250° C. is placed in the aluminium case, to impregnate the capacitor element with the melted TCNQ complex salt and immediately immerse the aluminium case in cooling water to cool and solidify the TCNQ complex salt, thereby recovering a desired solid electrolyte layer. Subsequently, the capacitor element is sealed with a resin to prepare a solid electrolytic capacitor.

The time required for the organic semiconductor from the completion of liquefaction to solidification under cooling is set preferably within one minute, more preferably within 15 seconds. As the heating and melting means of such organic semiconductor comprising the TCNQ complex salt as placed in the case, use may be made of the hot plate mode for heating the case on heater block, soldering bath, infrared melting mode, inductive heating mode and the like.

Because an oxide film is prepared on the surface of the cathode foil and the metal nitride is prepared thereon in the solid electrolytic capacitor prepared by the second method, as described above, the synergistic effect of the oxide film and the metal nitride may possibly make contributions to the improvement of the chemical stability of the surface of the cathode foil. Additionally, it is shown that the impedance property in a high-frequency region is improved. Owing to the improvement of the stability of the cathode foil, additionally, it is expected that the life duration property can also be improved.

Generally, metal foils processed with etching are used as such cathode foil. However, the use of metal foils with no etching process can never deteriorate the effect of the invention. The inventors additionally confirmed that the use of the cathode foil in accordance with the invention in an electrolytic capacitor using general electrolysis solutions can never yield the maximum capacitance which should be recovered in accordance with the invention, because the capacitance of the cathode foil then is never infinite, which may possibly be due to the formation of an electric bi-layer capacitor in the interface between the electrolyte solution and the cathode foil, which serves as a capacitance component.

BEST MODE FOR CARRYING OUT THE INVENTION

The invention will now be described in more detail with reference to examples.

1. FIRST EMBODIMENT

The cathode foil with a film comprising a metal nitride as prepared on the surface thereof in accordance with the embodiment was prepared as in the following Example 1. In Conventional Example 1, a conventional cathode foil was used.

EXAMPLE 1

An aluminium foil of a high purity (at a purity of 99%; thickness of 50 $\mu$m) was cut into pieces of 5.0 mm×225 mm. The resulting piece was used as a material to be treated, after etching process, to subsequently prepare a TiN film on the surface thereof by cathode arc plasma deposition process. Herein, the conditions for the cathode arc plasma deposition process were as follows. Using a Ti target in nitrogen atmosphere and heating the high-purity aluminium foil to 200° C., cathode arc plasma deposition was effected at $5\times10^{-3}$ Torr and at 300 A and 20 V. Subsequently winding the cathode foil together with the anode foil and a separator, a capacitor element of an element shape of 10Φ×10.5 L was prepared.

Placing a given amount of N-n-butylisoquinolinium TCNQ complex salt in a case of a dimension of 10Φ×10.5 L and heating the complex salt on a heater at about 300° C., the thermally melted TCNQ complex salt was recovered. In a solution thereof was immersed the capacitor element preliminarily heated and retained at 260° C., and the resulting capacitor element was immediately cooled in water as it was in the aluminium case, to solidify the TCNQ complex salt. Subsequently, the capacitor element was sealed with a resin, to prepare a solid electrolytic capacitor.

As the anode foil, use was made of a general anode aluminium foil of 5.0 mm×200 mm. As the separator, a manila paper of a thickness of 50 $\mu$m was used. The solid electrolytic capacitor was at a rating voltage of 6.3 WV and a rating current of 560 $\mu$F.

Conventional Example 1

As the material to be treated, the same material as in Example 1 was used. As the cathode foil, a cathode foil with no formation of any film comprising a metal nitride on the surface was used. Using the cathode foil, then, a solid electrolytic capacitor was prepared in the same manner as in Example 1.

Results of Comparison

The electrical properties of the solid electrolytic capacitors of Example 1 and the Conventional Example 1 as recovered by the aforementioned methods are shown in Table 1.

TABLE 1

|  | Cathode foil | Cap (μF) | tan δ (120 Hz) | ESR (mΩ) (100 kHz) |
|---|---|---|---|---|
| Conventional Example 1 | conventional cathode foil | 564.7 | 3.95 | 13.0 |
| Example 1 | TiN deposited | 1138.0 | 4.09 | 13.3 |

As apparently shown in Table 1, the mean value of the capacitance (Cap) in the Conventional Example 1 using the cathode foil with no formation of any film comprising a metal nitride on the surface thereof was as small as "564.7", while the mean value of the capacitance (Cap) in Example 1 was increased to about 2.02 fold the value in Conventional Example 1, namely "1138.0".

The reason why such results were recovered may be based on the following grounds. More specifically, in Example 1, a film comprising a metal nitride is prepared on the cathode foil by deposition process. The metal nitride removes a part of spontaneous oxide film formed on the surface of the cathode foil, so that the metal nitride and the cathode foil metal are in continuity. Therefore, the capacitance of the cathode foil is infinite, leading to the elimination of the capacitance component on the cathode foil surface, so that the capacitor capacitance as the composite capacitance of the anode foil and the cathode foil is equal to the capacitance of the anode foil alone, which describes the increase of the capacitance.

As described above, it is shown that the capacitance value of the solid electrolytic capacitor using the cathode foil with the film comprising the metal nitride as prepared on the surface thereof can be improved greatly.

2. SECOND EMBODIMENT

A cathode foil with an oxide film prepared on the surface and a film comprising a metal nitride as prepared thereon was prepared in the following Example 2. Additionally, a conventional cathode foil was used in Conventional Example 2. A cathode foil with the formation of a film comprising a metal nitride but with no formation of any oxide film was used in Comparative Example 2.

EXAMPLE 2

High-purity aluminium foil (at purity of 99% and thickness of 50 μm) cut into pieces of 5.0 mm×225 mm was used as a material to be treated. After etching process, the material was subjected to formation in an aqueous 0.15% ammonium dihydrogen phosphate solution at a formation voltage of 2 V. Thereafter, a TiN film was prepared on the surface thereof by cathode arc plasma deposition process. Further, the cathode arc plasma deposition process was effected at 5×10$^{-3}$ Torr and at 300 A and 20 V, by using a Ti target in nitrogen atmosphere and heating a high-purity aluminium foil to 200° C.

As the anode foil, a general aluminium foil of 5.0 mm×200 mm for anode was used, while as the separator, a manila paper of a thickness of 50 μm was used. Subsequently winding together the anode foil and the cathode foil through a separator, a capacitor element of an element shape of 10Φ×10.5 L was prepared.

Subsequently placing a given amount of N-n-butylisoquinolinium TCNQ complex salt in a case of a dimension of 10Φ×10.5 L, heating the complex salt on a heater at about 300° C., impregnating the capacitor element preliminarily heated and retained at 260° C. with the thermally melted TCNQ complex salt, and immediately cooling the whole aluminium case in water, the TCNQ complex salt was solidified. Subsequently sealing the case placing the capacitor element therein with a resin, a solid electrolytic capacitor was prepared. The solid electrolytic capacitor was at a rating voltage of 6.3 WV and a rating current of 560 μF.

Conventional Example 2

As the material to be treated, the same material as in Example 2 was treated with the etching process alone, and the resulting material was used as a cathode foil. The cathode foil was used to prepare a solid electrolytic capacitor in the same manner as in Example 2.

Comparative Example 2

As the material to be treated, the same material as in Example 2 was used for the same etching process and Ti deposition process as in Example 2, with no formation process, to prepare a cathode foil. The cathode foil was used to prepare a solid electrolytic capacitor in the same manner.

Comparative Results

The electrical properties of the solid electrolytic capacitors of Example 2, Conventional Example 2 and Comparative Example 2 as recovered by the aforementioned methods are shown in Table 2.

TABLE 2

|  | Cathode foil | Cap (μF) | tan δ (120 Hz) | ESR (mΩ) (100 kHz) |
|---|---|---|---|---|
| Example 2 | oxide film + TiN | 1136.2 | 3.52 | 11.9 |
| Conventional Example 2 | conventional cathode foil | 565.2 | 4.04 | 13.3 |
| Comparative Example 2 | TiN deposited | 1137.0 | 3.95 | 13.3 |

As apparently shown in Table 2, the capacitance of the solid electrolytic capacitor of Example 2 in accordance with the invention was increased to about 2 fold that of Conventional Example 2 with no formation of any film comprising a metal nitride on the surface. Further, ESR in the high-frequency region (100 kHz) was reduced by about 10%. Thus, it is indicated that the effect of the invention can be obtained.

Compared with Comparative Example 2 using the cathode foil treated solely with TiN deposition, with no oxide film prepared therein, ESR was also reduced by about 10%. Thus, it is indicated that the capacitance property and ESR property can be improved through the synergistic effect of the oxide film and TiN deposition in accordance with the invention.

Industrial Applicability

As described above, in a solid electrolytic capacitor prepared by assembling a capacitor element by winding together a cathode foil comprising a valve metal and an anode foil comprising a valve metal with an oxide film prepared on the surface thereof through a separator, to prepare an electrolyte layer comprising an organic semiconductor between the cathode foil and the anode foil, a film comprising a metal nitride is prepared on the surface of the cathode foil, to thereby allow the film comprising the metal nitride and the cathode metal foil to be in continuity.

Consequently, the capacitance component of the cathode foil is eliminated in case that the capacitance of the cathode foil is infinite, so that the capacitance of the capacitor is equal to the capacitance of the anode side and reaches maximum. Thus, the capacitance occurrence ratio of the capacitor can greatly be improved.

Additionally, in a solid electrolytic capacitor prepared by assembling a capacitor element by winding together a cathode foil comprising a valve metal and an anode foil comprising a valve metal with an oxide film prepared on the surface thereof through a separator to prepare an electrolyte layer comprising an organic semiconductor between the cathode foil and the anode foil, an oxide film is prepared on the surface of the cathode foil and a film comprising a metal nitride is additionally prepared thereon, so that the film comprising the metal nitride as prepared on the oxide film removes a part of the oxide film prepared on the surface of the cathode foil, to thereby allow the film comprising the metal nitride and the cathode metal foil to be in continuity. Consequently, the capacitance component of the cathode foil is eliminated in case that the capacitance of the cathode foil is infinite, so that the capacitance of the capacitor is equal to the capacitance of the anode side and reaches maximum. Thus, the capacitance occurrence ratio of the capacitor can greatly be improved.

Because the oxide film is prepared on the surface of the cathode foil and the metal nitride is additionally prepared thereon, the synergistic effect of the oxide film and the metal nitride improves the chemical stability of the surface of the cathode foil and improves the impedance property in the high-frequency region.

What is claimed is:

1. A solid electrolytic capacitor prepared by assembling a capacitor element by winding together a cathode foil comprising a valve metal and an anode foil comprising a valve metal with an oxide film prepared on a surface thereof through a separator to prepare an electrolyte layer comprising an organic semiconductor between the cathode foil and the anode foil, said capacitor comprising:
   a film made of a metal nitride formed on the surface of the cathode foil in such a manner that a part of a spontaneous oxide film formed on the surface of the cathode foil is partially removed to allow the cathode foil and the film of the metal nitride to be in continuity.

2. A solid electrolytic capacitor prepared by assembling a capacitor element by winding together a cathode foil comprising a valve metal and an anode foil comprising a valve metal with an oxide film prepared on a surface thereof through a separator, to prepare an electrolyte layer comprising an organic semiconductor between the cathode foil and the anode foil, said capacitor comprising:
   an oxide film formed on the surface of the cathode foil; and
   a film made of a metal nitride formed on the oxide film in such a manner that a part of the oxide film on the surface of the cathode foil is partially removed to allow the cathode foil and the film of the metal nitride to be in continuity.

3. A solid electrolytic capacitor according to claim 1, where the organic semiconductor is a TCNQ complex salt.

4. A solid electrolytic capacitor according to claim 1, where the valve metal is aluminium.

5. A solid electrolytic capacitor according to claim 1, where the metal nitride is any of TiN, ZrN, TaN and NbN.

6. A solid electrolytic capacitor according to claim 1, where the metal nitride is prepared by a deposition process.

7. A solid electrolytic capacitor according to claim 6, where the deposition process is cathode arc plasma deposition process.

8. A method for preparing a solid electrolytic capacitor comprising assembling a capacitor element by winding together a cathode foil comprising a valve metal and an anode foil comprising a valve metal with an oxide film prepared on a surface thereof through a separator to prepare an electrolyte layer comprising an organic semiconductor between the cathode foil and the anode foil, said method comprising the step of:
   forming a film made of a metal nitride on the surface of the cathode foil in such a manner that a part of a spontaneous oxide film formed on the surface of the cathode foil is partially removed to allow the cathode foil and the film of the metal nitride to be in continuity.

9. A method for preparing a solid electrolytic capacitor comprising assembling a capacitor element by winding together a cathode foil comprising a valve metal and an anode foil comprising a valve metal with an oxide film prepared on a surface thereof through a separator to prepare an electrolyte layer comprising an organic semiconductor between the cathode foil and the anode foil, said method comprising the steps of:
   forming an oxide film on the surface of the cathode foil; and
   forming a film made of a metal nitride on the oxide film in such a manner that a part of the oxide film on the surface of the cathode foil is partially removed to allow the cathode foil and the film of the metal nitride to be in continuity.

10. A solid electrolytic capacitor according to claim 2, where the organic semiconductor is a TCNQ complex salt.

11. A solid electrolytic capacitor according to claim 2, where the valve metal is aluminium.

12. A solid electrolytic capacitor according to claim 2, where the metal nitride is any of TiN, ZrN, TaN and NbN.

13. A solid electrolytic capacitor according to claim 2, where the metal nitride is prepared by a deposition process.

14. A method for preparing a solid electrolytic capacitor comprising the steps of:
   providing a cathode foil of a valve metal;
   heating the cathode foil to a temperature between 200° C. to 450° C.;
   depositing a metal nitride film on the cathode foil by a cathode arc plasma deposition process with a metal target in a nitrogen atmosphere to provide a direct continuity between the metal nitride and the valve metal;
   providing an anode foil of a valve metal;
   providing a separator;
   winding the cathode foil, separator, and anode foil together to provide a capacitor element with terminals;
   placing the capacitor element in a housing;
   melting a TCNQ complex salt in the housing to impregnate the capacitor element; and
   sealing the impregnated capacitor element to provide the solid electrolytic capacitor.

15. The method of claim 14 further including the step of providing an oxide film on the cathode foil prior to depositing the metal nitride.

16. The method of claim 15 wherein the oxide film is formed by applying a voltage of 10 volts or less to the cathode foil immersed in a phosphate formation solution.

17. The method of claim 16 wherein the phosphate formation solution has a concentration of 0.005% to 3% ammonium dihydrogen phosphate.

18. The method of claim 17 wherein the applied voltage is about 1 volt.

* * * * *